(No Model.)

A. C. EVANS.
REEL AND WIRE FOR CHECK ROW CORN PLANTERS.

No. 304,812. Patented Sept. 9, 1884.

Attest
Carl Spengel
Ed. W. Rector

Inventor
Austin C. Evans
by Stem & Beck Atty's

UNITED STATES PATENT OFFICE.

AUSTIN C. EVANS, OF SPRINGFIELD, OHIO.

REEL AND WIRE FOR CHECK-ROW CORN-PLANTERS.

SPECIFICATION forming part of Letters Patent No. 304,812, dated September 9, 1884.

Application filed May 5, 1884. (No model.)

*To all whom it may concern:*

Be it known that I, AUSTIN C. EVANS, a citizen of the United States, residing at Springfield, in the county of Clark and State of Ohio, have invented certain new and useful Improvements in Reels and Wires for Check-Row Corn-Planters, of which the following is a full, true, and exact description, reference being had to the accompanying drawings, forming a part of this specification.

My invention relates to laying out and rewinding reels and wires for check-row cornplanters; and its novelty consists in the construction and combination of the parts forming the same, as will be herewith set forth and specifically claimed.

Figure 1:
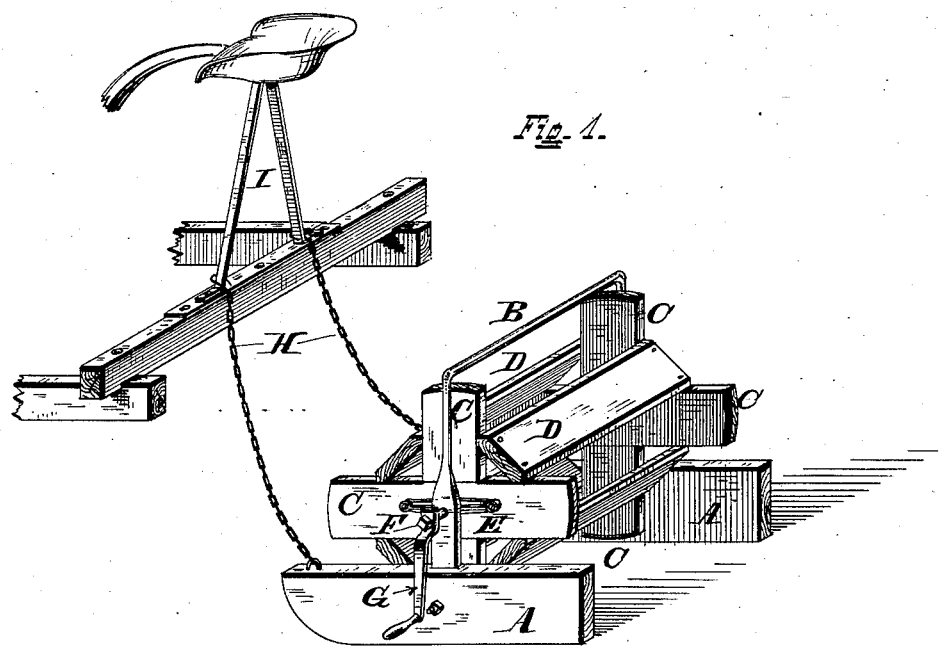
Figure 2:
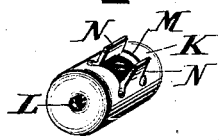
Figure 3:
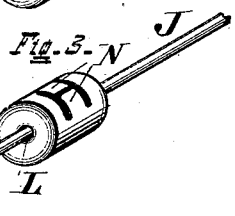
Figure 4:
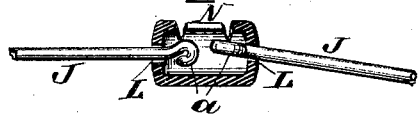

In the accompanying drawings, Figure 1 is a perspective view of my improved reel, showing its mode of attachment to the rear of the planter. Fig. 2 is a perspective view of one of my improved buttons for connecting the links of the wire and operating the check-row mechanism, and having its lips open. Fig. 3 is a corresponding view with the links inserted and swiveled to the button, and with the lips closed. Fig. 4 is a longitudinal central sectional view of the same.

The first feature of my invention consists in such a construction of the reel and its combination with a runner-frame that it may rest and travel upon the ground, and be hooked by chains or otherwise to the rear of the planter, so as to travel with the same in paying off the wire preparatory to and while in the act of laying out the wire; also, in such a construction of the runner-frame that the yoke which connects the runners and serves as a support for the reel also serves as a handle to lift the entire device around or transport it from place to place; also, in a handle or crank by which, when desired, the reel may be revolved, in order to rewind upon it the wire at the conclusion of the work.

A A represent two runners connected together at suitable distance apart by a yoke, B, preferably of wrought metal, and in which the reel is journaled, as shown in Fig. 1. This reel is preferably constructed of the two crossheads C at each end, to which are fastened the inclined boards or strips D in the manner shown. The reel thus formed has secured at each end, by the spider or arms E, the spindles F, which pass through apertures in the upright flattened portions of the yoke B, thus forming the journals upon which the reel revolves, and by means of which it is connected to the runner-frame.

G is any suitable crank or handle applied to either of the spindles for revolving the reel when it is desired to wind the wire upon it.

By means of chains H secured to the runners the reel-frame and reel may be connected to the rear of the planter by merely hooking the ends of the chains around the seat-uprights I, thus enabling the connection to be made with little or no trouble.

The wire intended to be used with the reel differs only from other check-row wires in the construction of the buttons, which serve both to operate the check-row mechanism and to connect the links by swivel-joints; and the novelty of my improved button consists in constructing it of a hollow shell, K, having solid ends, with central perforations, L, through which the ends of the links J of the check-row wire are passed. Upon the side of the button is an opening, M, formed by cutting out one or two lips or flaps, N, which opening and flaps or lips serve the following purpose: The unbent ends of the links are inserted through the apertures L in the ends of the button and up through and out of the opening M, thereby enabling the ends of the wire to be doubled back or upset, as seen at *a*, Fig. 4, whereupon they are drawn back into the button, and the lips N are pressed down, closing the opening M and shutting them in. By this construction I produce a button with solid ends and with practically solid sides, forming a shell or case completely enveloping the swiveled ends of the links, so as to prevent both the admission of dirt, which might interfere with the free swiveling of the button, and prevent injury to the ends of the links, as will be readily understood.

I do not limit myself to the shape or location of the opening M or lips N, as these might be varied infinitely without departing from the nature or spirit of my invention.

I am aware that buttons have been before constructed having one solid perforated end, but with the other end split or slotted across the aperture for the link, so as to enable the introduction of the looped ends of the links, whereupon by squeezing together the slotted or split half of the button the links were inclosed. This construction, however, is open to the objection that the longitudinal strain upon the wire would tend to spread apart the split end of the button, and thereby permit the disconnection of the links and consequent severance of the chain.

I am also aware that skeleton buttons have been produced in which the ends of the links were connected, and I do not claim such as my invention.

Having thus fully described my invention, I claim—

1. A combined reel and runner-frame for check-row wires, adapted to be connected at pleasure to the rear of a planter, and to rest and be drawn upon the ground, substantially as described.

2. A combined reel and runner-frame united by a straddling yoke serving as a means for connecting the parts, and as a handle for lifting or transporting the reel, substantially as described.

3. The combination, with a check-row corn-planter and its operating-wire, of a reel mounted on a runner-frame, substantially as described.

4. The herein-described reel, consisting of the runners A, yoke B, cross-head C, boards D, spindles F, and crank G, the parts constructed and united substantially in the manner and for the purpose specified.

5. An operating-button for check-row wires, consisting of a hollow shell with solid centrally-perforated ends and an opening upon the side adapted to be closed by one or more integral lips, in combination with the links of the wire adapted to be swiveled therein, substantially in the manner and for the purpose specified.

AUSTIN C. EVANS.

Witnesses:
  WM. H. GRIFFITH,
  CHAS. R. WHITE.